(12) United States Patent
Pangrazio, III et al.

(10) Patent No.: US 9,196,000 B2
(45) Date of Patent: Nov. 24, 2015

(54) METHOD AND SYSTEM FOR MANAGING DISTRIBUTION OF DIGITAL RIGHTS AND REVENUE FOR INTEGRATED SYSTEMS

(75) Inventors: Donald M. Pangrazio, III, LeRoy, NY (US); Jonathan D. Levine, Rochester, NY (US); Michael J. Evan, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 854 days.

(21) Appl. No.: 13/412,994

(22) Filed: Mar. 6, 2012

(65) Prior Publication Data

US 2013/0238468 A1    Sep. 12, 2013

(51) Int. Cl.
*G06Q 30/00* (2012.01)
*G06Q 30/06* (2012.01)
*G06F 21/10* (2013.01)

(52) U.S. Cl.
CPC ............ *G06Q 30/0601* (2013.01); *G06F 21/10* (2013.01); *G06Q 30/00* (2013.01)

(58) Field of Classification Search
CPC ..................................... G06Q 30/06–30/0645
USPC ................................................ 705/26.1–27.2
See application file for complete search history.

(56) References Cited

U.S. PATENT DOCUMENTS

| | | |
|---|---|---|
| 5,790,664 A | 8/1998 | Coley |
| 5,949,964 A | 9/1999 | Clouthier et al. |
| 7,343,297 B2 | 3/2008 | Bergler |
| 7,484,103 B2 | 1/2009 | Woo |
| 7,580,858 B2 | 8/2009 | Almeida |
| 2002/0091645 A1 | 7/2002 | Tohyama |
| 2004/0024688 A1* | 2/2004 | Bi et al. ........................ 705/37 |
| 2005/0080733 A1 | 4/2005 | McIntosh |
| 2006/0059098 A1 | 3/2006 | Major |
| 2006/0064582 A1 | 3/2006 | Teal |
| 2006/0075505 A1 | 4/2006 | Murthy |
| 2006/0173784 A1 | 8/2006 | Marples |

(Continued)

OTHER PUBLICATIONS

Hampton-Sosa, W. (2011). Unauthorized file sharing of digital culture products over P2P networks: The influence of product and interface attributes (Order No. 3469865). Available from ProQuest Central; ProQuest Dissertations & Theses Full Text. (894337473). Retrieved from http://search.proquest.com/docview/894337473?accountid=14753.*

(Continued)

*Primary Examiner* — Resha Desai
*Assistant Examiner* — Alex Wolcott
(74) *Attorney, Agent, or Firm* — Basch & Nickerson LLP

(57) ABSTRACT

A system and method collects fees for usage of a dynamically constructed digital product including a plurality of diverse digital components, each diverse digital component having different restrictions and usage fees. The system and method enable a user to select parameters for a dynamic digital product; identify diverse individual digital components needed to construct a dynamic digital product; dynamically construct the dynamic digital product based upon the identified diverse digital components; collect information directed to restrictions and usage fees for each identified diverse digital component; generate an integrated license for the dynamically constructed digital product based upon the collected information; monitor individual usage of the diverse individual digital components; and generate payments, in response to monitored individual usage of the diverse individual digital components, to entities associated with the diverse individual digital components.

6 Claims, 3 Drawing Sheets

(56) References Cited

U.S. PATENT DOCUMENTS

| | | |
|---|---|---|
| 2007/0038574 A1* | 2/2007 | Fanning et al. ............ 705/59 |
| 2008/0010153 A1* | 1/2008 | Pugh-O'Connor et al. .... 705/14 |
| 2008/0120230 A1 | 5/2008 | Lebegue |
| 2008/0288504 A1* | 11/2008 | Fisher et al. ............ 707/10 |
| 2009/0024631 A1 | 1/2009 | Monahan |
| 2010/0004938 A1 | 1/2010 | Sundstrom |
| 2010/0031324 A1 | 2/2010 | Strich |
| 2010/0211968 A1 | 8/2010 | Itskov |

OTHER PUBLICATIONS

Masur, S. (2011). Collective Rights Licensing for Internet Downloads and Streams: Would it Properly Compensate Rights Holders? Journal of Internet Law, 15(5), 3-15. Retrieved from http://search.proquest.com/docview/913000193?accountid=14753.*

* cited by examiner

METHOD AND SYSTEM FOR MANAGING DISTRIBUTION OF DIGITAL RIGHTS AND REVENUE FOR INTEGRATED SYSTEMS

BACKGROUND

Conventional digital content and service provisions are becoming more sophisticated in various licensing and intellectual property protections. Digital content distribution may include mechanisms for protecting intellectual property rights, such as limits on usage or copying. Digital service provisions may include the collection of licensing fees for use of a particular digital service.

Another use of digital content and service provisions is the dynamic assembly of digital service and/or content components to provide a dynamic digital solution or product. The dynamic digital solution or product may be assembled from a number of different digital components wherein each digital content or service component may have particular rights, limitations, or licensing fees associated therewith.

However, dynamic digital solutions or products create issues with respect to collection of fees and the distribution of such fees to the appropriate entities because conventionally, the conventional form of payment for digital content and/or services has been a single payment mechanism, such as the user making a single payment to a single entity for the dynamic digital solution.

The single payment mechanism raises many issues, such as pricing a dynamic digital solution, assembling the appropriate rights and licenses, collecting payment, and/or proper distribution of the collected fees, etc.

Thus, it would be desirable to provide the user of a dynamic digital solution or product with a single payment and licensing system.

It would also be desirable to realize a dynamic digital solution or product generation process that includes a mechanism to automatically generate the dynamic digital solution or product, the appropriate pricing, and/or assembling of the appropriate rights and licenses without end user intervention.

Furthermore, it would be desirable to realize a dynamic digital solution or product generation process that includes a mechanism to combine the rights and licensing requirements of the individual digital content and service components, making up the dynamic digital solution or product, into a single licensing structure that can be presented to the end user.

BRIEF DESCRIPTION OF THE DRAWING

The drawings are only for purposes of illustrating various embodiments and are not to be construed as limiting, wherein.

DETAILED DESCRIPTION

Figure 1:
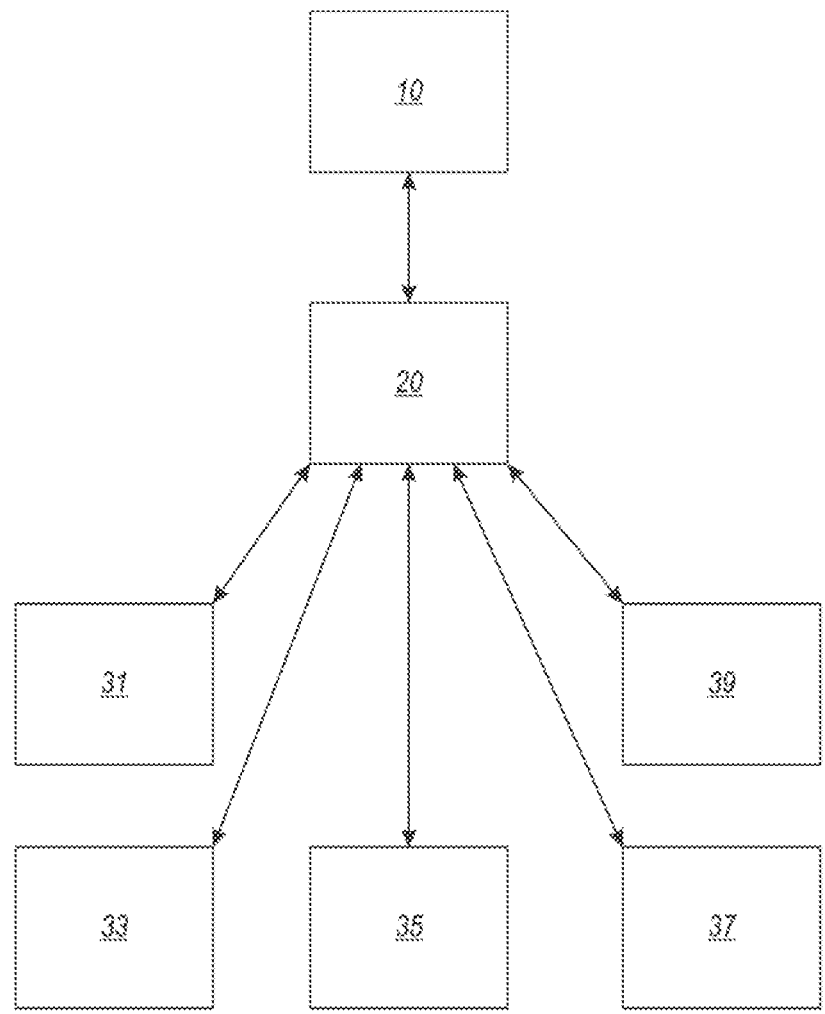
FIG. 1 illustrates a block diagram of a system for generating and managing a license for multiple components of a dynamically constructed digital product.

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts could be properly illustrated.

In the following discussion, the word license will be taken to mean a license for using a particular service or content and/or a mechanism to control intellectual property rights associated with the particular service or content.

FIG. 1 shows a block diagram of a system that generates an end user license that combines the license requirements of a number of components that are being combined to form a dynamically constructed digital product.

As illustrated in FIG. 1, a client device 10 enables a user to select a dynamic digital product. The client device 10 may include a processor, memory, and a communication component. A product providing device 20 is operatively in communication with the client device 10. The product providing device 20 dynamically constructs the dynamic digital product selected by the user. The product providing device 20 may include a processor, memory, and a communication component.

The product providing device 20 identifies diverse individual digital components needed to construct dynamic digital product selected by the user. The product providing device 20 is operatively in communication with various third party providing devices (31, 33, 35, 37, and 39) which are able to provide the identified diverse individual digital components needed to construct dynamic digital product.

The product providing device 20 dynamically constructs the dynamic digital product based upon the identified diverse digital components received from the various third party providing devices (31, 33, 35, 37, and 39). The various third party providing devices (31, 33, 35, 37, and 39) may also provide information directed to restrictions and usage fees for each identified diverse digital component provided therefrom.

The product providing device 20 may generate an integrated license for the dynamically constructed digital product based upon the received information, wherein the integrated license governs restrictions on the usage of the dynamically constructed digital product and/or usage fees thereof.

The product providing device 20 may add a monitoring component to the dynamically constructed digital product to monitor individual usage of the diverse individual digital components used to generate the dynamically constructed digital product, wherein the monitoring component corresponds to the integrated license governing restrictions on the usage of the dynamically constructed digital product.

The product providing device 20 may generate payments, in response to information received from the monitoring component in the dynamically constructed digital product, to entities associated with the diverse individual digital components or to the various third party providing devices (31, 33, 35, 37, and 39) based upon the monitored individual usage of the diverse individual digital components.

Alternatively, client device 10 may communicate directly with the various third party providing devices (31, 33, 35, 37, and 39) to select diverse digital components to generate a dynamic digital product. In such a situation, the various third party providing devices (31, 33, 35, 37, and 39) provide, directly to the client device 10, the diverse digital components selected by the user and restriction information directed to restrictions and usage fees for each diverse digital component.

The client device 10 dynamically constructs the dynamic digital product based upon the diverse digital components provided by the various third party providing devices (31, 33, 35, 37, and 39). The client device 10 generates an integrated license for the dynamically constructed digital product based upon the provided restriction information, wherein the integrated license governs restrictions on the usage of the dynamically constructed digital product and/or usage fees thereof, the dynamically constructed digital product may include a monitoring component to monitor individual usage of the diverse individual digital components used to generate the dynamically constructed digital product, the monitoring component corresponding to the integrated license governing restrictions on the usage of the dynamically constructed digital product.

The client device 10 generates payments, in response to information received from the monitoring component in the dynamically constructed digital product, to entities associated with the diverse individual digital components or to the various third party providing devices (31, 33, 35, 37, and 39) based upon the monitored individual usage of the diverse individual digital components.

Figure 2:
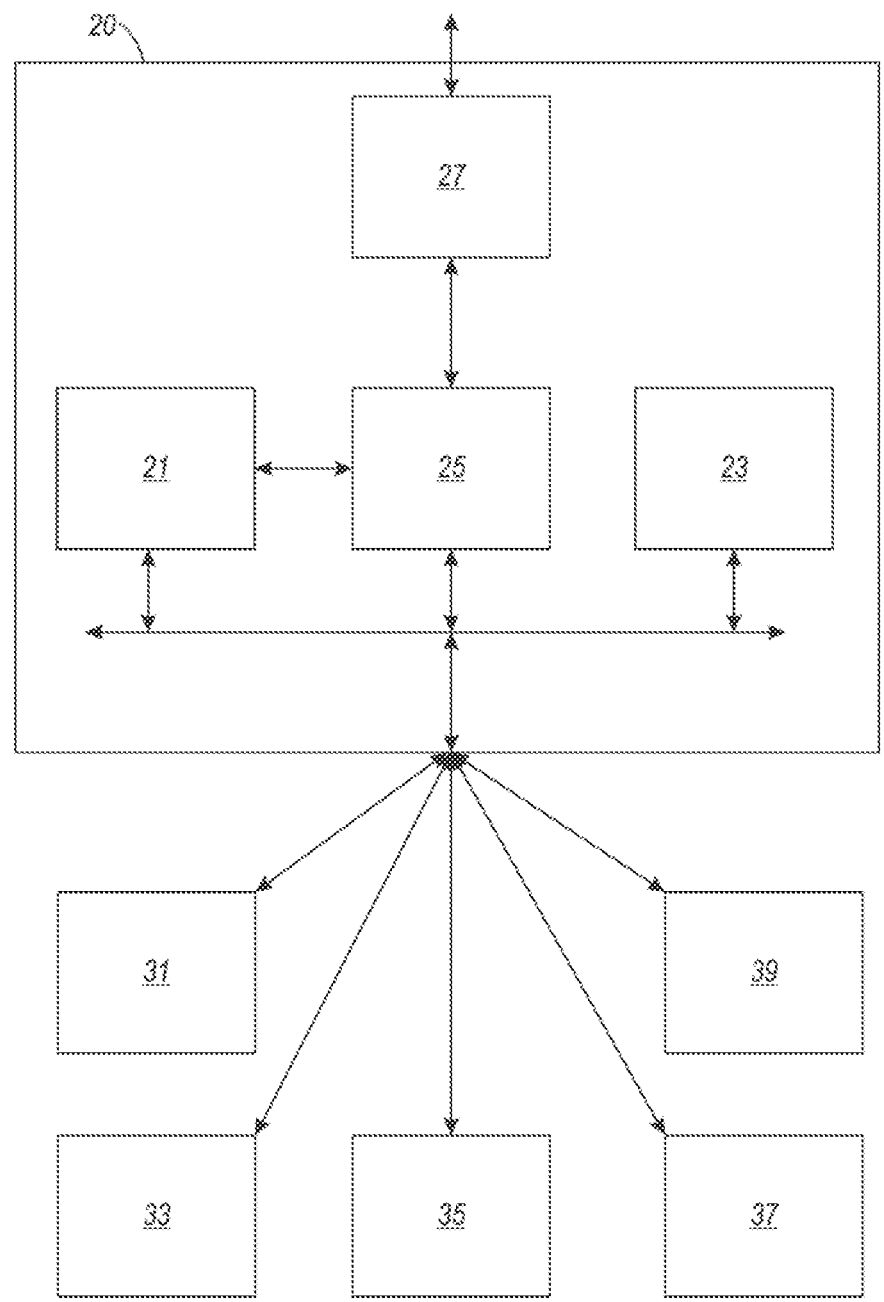
FIG. 2 illustrates a block diagram of a system for generating a dynamically constructed digital product.

As illustrated in FIG. 2, the product providing device 20 includes a dynamically constructed digital product generating device 25 that dynamically constructs the dynamic digital product based upon the diverse digital components provided by the various third party providing devices (31, 33, 35, 37, and 39).

The product providing device 20 also includes a license generation component 21 which enables the generation of a license to be attached to the dynamically constructed digital product that includes a number of independent components, each having unique restrictions and usage fees.

The license generation component 21, as illustrated in FIG. 2, is in communication with the various third party providing devices (31, 33, 35, 37, and 39) so as to collect information relating to the unique restrictions and usage fees for each provided diverse individual digital component.

The license generation component 21 generates a system level license based upon the received component licenses. The system level license may include provisions for addressing the various license requirements of the individual components and provide the end user of the dynamically constructed digital product with a single license.

The system level license may also include provisions for protection of any intellectual property rights associated with the components. Furthermore, the system level license may include provisions for payment of any usage fees associated with the components. These payment provisions may include a defined division of fees paid by the end-user to the owners of the individual components.

Information about each of the components that make up the dynamically constructed digital product is received by the license generation component 21. The license generation component 21 may, alternatively, access a database (not shown) which contains information about the license requirements of each component.

For example, the dynamically constructed digital product may include the use of four components (A, B, C, and D). Each of these components has information about its particular license requirements stored in a database. Each of these license requirements may include information about the type of license the component requires; e.g., a one-time paid up license for usage of the component or a per-use fee for usage of the component.

The licenses may further include provisions for multiple usage of the component; e.g., the fee for one-time paid up license might change if the number of users of the component exceeds a particular threshold or the fee for a per-use component might change for large volume usage of the component.

The license generation component 21 combines the requirements of the individual license components into a single license. This license may have associated therewith a set of permissions and/or restrictions on the usage of a component; e.g., the user of the component may have permission to use the component, but may be restricted on the usage of the component beyond the licensed solution or product.

The license information may be recorded in a financial component 23. The financial component 23 may store, in a database, information about any fees associated with the recorded license. The database also may include information about any division of license fees between owners of the individual components.

When an end user uses the dynamically constructed digital product covered by the system level license, a check is made to see if the permissions associated with the dynamically constructed digital product are met by the end user. These permissions may be limited to a single user or may be associated with all users of a particular device or software system.

If the permission requirements are met by the user, the dynamically constructed digital product is enabled and the usage information for that particular usage is recorded and the usage information is forwarded to the financial component 23. The financial component 23 generates payments to the individual component owners.

The payments might be made for each use of the component or may be recorded by the financial component 23 and actual payment is made when the accumulated or aggregated fees reach a predetermined level or on a periodic basis.

The system level license generated by the license generation component 21 may take into account the individual license requirements of each component. If, for example, a component requires a payment of a one-time fee for usage of the component, the system level license may include information that allows the financial component 23 to issue payment to the owner of such a component upon the first time the component is used.

The license generation component 21 controls the process for generation of a license to cover usage of a newly developed dynamically constructed digital product. The dynamically constructed digital product may involve integration of several different components, services and/or content, each of which has its own licensing and access requirements.

For example, component A may require a one-time license fee to be paid upon purchase of the component. Component B may require a specific payment for each use of the component. Component C may include restrictions on the use of its content to only those who have paid a license fee.

The license generation component 21 uses the input information to generate a system level license for the dynamically constructed digital product. This system level license is the only license with which the end user interacts.

Figure 3:
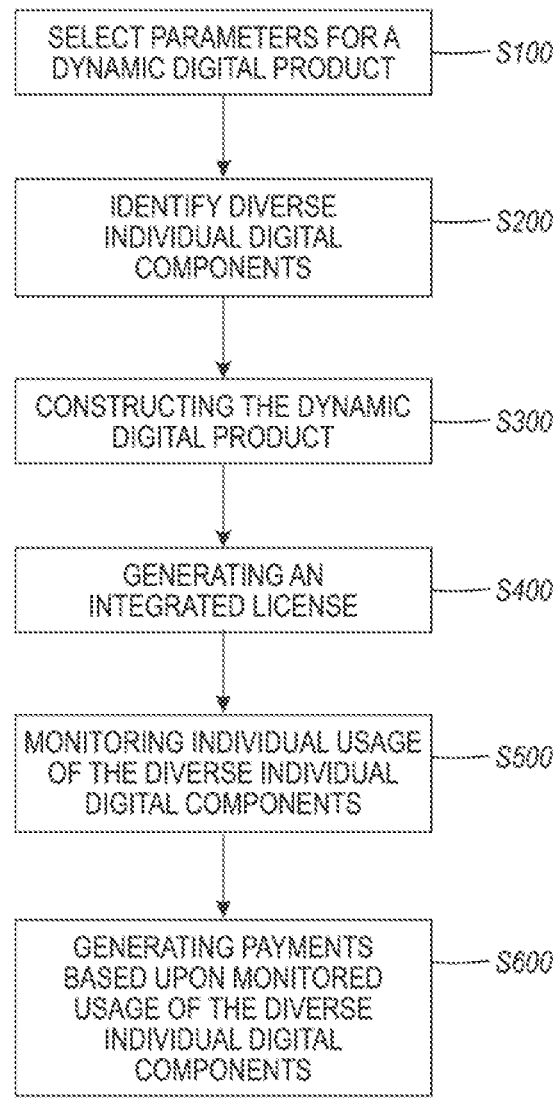
FIG. 3 illustrates a flowchart showing the generation of a dynamically constructed digital product.

FIG. 3 illustrates a flowchart showing the generation of a dynamically constructed digital product. As illustrated, the illustrated flowchart enables a user to select parameters for a dynamic digital product, the client device including a processor, memory, and a communication component, at step S100. At step S200, diverse individual digital components needed to construct a dynamic digital product corresponding to the user selected parameters are identified. The dynamic digital product is dynamically constructed based upon the identified diverse digital components, at step S300.

At step S400, an integrated license for the dynamically constructed digital product is generated based upon information governing restrictions on the usage of the dynamically constructed digital product. Individual usage of the diverse individual digital components used to generate the dynamically constructed digital product is monitored, at step S500.

At step S600, payments are generated payments, in response to monitored individual usage of the diverse individual digital components, to entities associated with the diverse individual digital components, thereby enabling creators of solution integrations, software, and digital content to get paid for the use of their creations.

An example of dynamically constructing a digital product may have a company select three third-party applications to be integrated into a solution for their customers. In this example, the third-party companies agree to forgo normal license fees in return for a percentage of the fees generated from use of the software. The company creates, using integration code that enables the applications to automatically communicate with each other and to initiate invoicing and/or receive payments, the integrated solution made up of the three applications. In this example, the parties agree to a certain allocation of the revenues received from the integration solution such that provided of the integrated solution may periodically access the billing information for the integration solution and automatically allocate the appropriate revenue percentages to the appropriate contributors and companies.

In another example, a company may authorize a team to write a cloud-based software service that translates English-to-French and French-to-English text with 99% accuracy. The company decides that the team will receive a certain percentage of the revenue and to allocate the remainder of the revenue to the company. Thus, when a translation operation is performed, the user pays a fee to the company who automatically distributes the correct percentages to the team and to the company. It is noted that metadata can also be collected by the system to determine the real value of the cloud-based software service and adjust the revenue allocations as necessary.

In a third example, a document may be created instantly from multiple data sources. When a user creates such a document, money can be transferred from the user's account and distributed in correct percentages to the participating data source providers.

In another example, a company may select two third-party applications to be integrated into a solution for its customers. One of the applications (component A) may be a server-based application with a standard software license that provides access to the software after the license fee is paid at the time component is installed, up to one hundred users. Beyond one hundred users, additional fees are required. The second application (component V) is a cloud-based application with a pay-per-use license and no up-front costs.

In this example, one of the company's customers requires a pay-per-use version of the solution; however, the vendor of component A refuses to update its software to accommodate a pay-per-use application, and it is the only component that can be used for this solution.

Using the concepts discussed above, the company may provide its client with a pay-per-use solution, even though component A does not provide the appropriate licensing. In this solution, the company configures its solution for the client and pays the vendor of component A its license fee; however, the client is billed on a pay-per-use basis. Moreover, when the number of users reaches one hundred, a payment of the additional license fee to the vendor of component A is triggered. Meanwhile, the client continues to be billed based on a pay-per-use basis.

In the examples described above, a dynamically constructed digital product can be provided in which the various owners of the content may be paid fairly for the use of their creations and efforts with an ongoing revenue stream generated by the use of their portion of the integration. In other words, for every operation, or workflow step, or piece of content that makes up a dynamically constructed digital product, the revenue can be shared differently (as appropriate by usage) for each element and differently (by contractual agreement) across multiple entities.

It is noted that in the various examples discussed above, a license may information defining a payment type (pay-per-use; pay for installation; etc.); permission types (number of users; number of concurrent users; types of external users; etc.); user definitions (who can use the product or access the content); interactions between permissions and payments (discounts for larger numbers of users; etc.); renewal criteria; types of enforcement methods; types of compliance agreements (penalties for non-compliance, etc.; the associated product and vendor); and/or usage restrictions (e.g. time; days of the week; etc.).

In summary, a system collects fees for usage of a dynamically constructed digital product, the dynamically constructed digital product including a plurality of diverse digital components, each diverse digital component having different restrictions and usage fees associated therewith.

The system includes a client device for enabling a user to select a dynamic digital product, the client device including a processor, memory, and a communication component; and a product providing device, operatively in communication with said client device, for dynamically constructing the dynamic digital product selected by the user, the product providing device including a processor, memory, and a communication component.

The product providing device identifies diverse individual digital components needed to construct dynamic digital product selected by the user and dynamically constructs the dynamic digital product based upon the identified diverse digital components.

The product providing device collects information directed to restrictions and usage fees for each identified diverse digital component and generates an integrated license for the dynamically constructed digital product based upon the collected information, the integrated license governing restrictions on the usage of the dynamically constructed digital product.

The product providing device adds a monitoring component to the dynamically constructed digital product to monitor individual usage of the diverse individual digital components used to generate the dynamically constructed digital product, the monitoring component corresponding to the integrated license governing restrictions on the usage of the dynamically constructed digital product.

The product providing device generates payments, in response to information received from the monitoring component in the dynamically constructed digital product, to entities associated with the diverse individual digital components based upon the monitored individual usage of the diverse individual digital components used to generate the dynamically constructed digital product.

The product providing device may generate payments to an entity associated with individual digital component when an aggregated amount of usage for the individual digital component reaches a predetermined threshold.

The product providing device may generate an integrated license based upon the payment requirements of the user; generate an integrated license based upon the payment requirements of the identified diverse digital component; generate an integrated license based upon a hybridization of the payment requirements of the identified diverse digital component and the payment requirements of the user; and/or generate an integrated license based upon a hybridization of the usage restrictions of the identified diverse digital component and the usage restrictions of the user.

A system pays fees for usage of a dynamically constructed digital product, the dynamically constructed digital product including a plurality of diverse digital components, each diverse digital component having different restrictions and usage fees associated therewith. The system includes a client device for enabling a user of the client device to select diverse digital components to generate a dynamic digital product, the client device including a processor, memory, and a communication component.

The system also includes digital component providing devices, operatively in communication with the client device, for providing the diverse digital components selected by the user of the client device, the digital component providing devices including a processor, memory, and a communication component.

The digital component providing devices provide, to the client device, restriction information directed to restrictions and usage fees for each diverse digital component.

The client device dynamically constructs the dynamic digital product based upon the diverse digital components provided by the digital component providing devices and generates an integrated license for the dynamically constructed digital product based upon the provided restriction information, the integrated license governing restrictions on the usage of the dynamically constructed digital product, the dynamically constructed digital product including a monitoring component to monitor individual usage of the diverse individual digital components used to generate the dynamically constructed digital product, the monitoring component corresponding to the integrated license governing restrictions on the usage of the dynamically constructed digital product.

The client device generates payments, in response to information received from the monitoring component in the dynamically constructed digital product, to entities associated with the diverse individual digital components based upon the monitored individual usage of the diverse individual digital components used to generate the dynamically constructed digital product.

The client device may generate payments to an entity associated with individual digital component when an aggregated amount of usage for the individual digital component reaches a predetermined threshold.

The client device may generate an integrated license based upon the payment requirements of the user; generate an integrated license based upon the payment requirements of the identified diverse digital component; generate an integrated license based upon a hybridization of the payment requirements of the identified diverse digital component and the payment requirements of the user; and/or generate an integrated license based upon a hybridization of the usage restrictions of the identified diverse digital component and the usage restrictions of the user.

A method collects fees for usage of a dynamically constructed digital product, the dynamically constructed digital product including a plurality of diverse digital components, each diverse digital component having different restrictions and usage fees associated therewith.

The method enables a user, at a client device, to select parameters for a dynamic digital product, the client device including a processor, memory, and a communication component; communicates the user selected parameters for a dynamic digital product to a product providing device, the product providing device including a processor, memory, and a communication component; identifies, by the product providing device, diverse individual digital components needed to construct a dynamic digital product corresponding to the user selected parameters; dynamically constructs, by the product providing device, the dynamic digital product based upon the identified diverse digital components; collects, by the product providing device, information directed to restrictions and usage fees for each identified diverse digital component; generates, by the product providing device, an integrated license for the dynamically constructed digital product based upon the collected information, the integrated license governing restrictions on the usage of the dynamically constructed digital product; adds, by the product providing device, a monitoring component to the dynamically constructed digital product to monitor individual usage of the diverse individual digital components used to generate the dynamically constructed digital product, the monitoring component corresponding to the integrated license governing restrictions on the usage of the dynamically constructed digital product; delivers, to the client device, the monitoring component included dynamically constructed digital product; provides, by the client device, to the product providing device information corresponding to monitored individual usage of the diverse individual digital components; and generates payments, by the product providing device, in response to received information corresponding to monitored individual usage of the diverse individual digital components, to entities associated with the diverse individual digital components.

The payments to an entity associated with individual digital component may be generated when an aggregated amount of usage for the individual digital component reaches a predetermined threshold.

The integrated license may be generated based upon the payment requirements of the user; generated based upon the payment requirements of the identified diverse digital component; generated based upon a hybridization of the payment requirements of the identified diverse digital component and the payment requirements of the user; and/or generated based upon a hybridization of the usage restrictions of the identified diverse digital component and the usage restrictions of the user.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A system for dynamically constructing a dynamic digital product from a plurality of diverse individual digital components, for monitoring usage of each diverse individual digital component used in dynamically constructing the digital product, and for collecting and disbursing fees associated with monitored usage, each diverse digital individual component having different restrictions and usage fees associated therewith, each diverse individual digital component being associated with a third party entity, comprising:
    a client device for enabling a user of said client device to select diverse individual digital components, said client device including a processor, memory, and a communication component; and
    digital component providing devices, operatively in communication with said client device, for providing said diverse individual digital components selected by the user of said client device, each digital component providing device including a processor, memory, and a communication component;

said digital component providing devices providing, to said client device, restriction information directed to restrictions and usage fees for each diverse individual digital component;

said client device dynamically constructing a dynamic digital product based upon said diverse individual digital components provided by said digital component providing devices;

said client device generating an integrated license for the dynamically constructed digital product based upon the provided restriction information and attaching said integrated license to the dynamically constructed digital product, said integrated license governing restrictions on the usage of the dynamically constructed digital product and governing restrictions on the usage of each diverse individual digital component in the dynamically constructed digital product;

said client device adding to the dynamically constructed digital product a monitoring component to monitor individual usage of said diverse individual digital components used to construct the dynamically constructed digital product, said monitoring component corresponding to the integrated license governing restrictions on the usage of the dynamically constructed digital product and the restrictions on the usage of each diverse individual digital component in the dynamically constructed digital product;

said client device generating payments, in response to information received from said monitoring component in the dynamically constructed digital product, to the third party entities associated with said diverse individual digital components based upon the monitored individual usage of said diverse individual digital components used to construct the dynamically constructed digital product.

2. The system as claimed in claim 1, wherein said client device generates payments to third party entity associated with a diverse individual digital component when an aggregated amount of usage for the diverse individual digital component reaches a predetermined threshold.

3. The system as claimed in claim 1, wherein said client device generates an integrated license based upon payment requirements of the user.

4. The system as claimed in claim 1, wherein said client device generates an integrated license based upon payment requirements of said diverse individual digital components in the dynamically constructed digital product.

5. The system as claimed in claim 1, wherein said client device generates an integrated license based upon a hybridization of payment requirements of diverse individual digital components in the dynamically constructed digital product and payment requirements of the user.

6. The system as claimed in claim 1, wherein said client device generates an integrated license based upon a hybridization of the usage restrictions of diverse individual digital components in the dynamically constructed digital product and usage restrictions of the user.

* * * * *